(12) United States Patent
Mohammad et al.

(10) Patent No.: US 11,442,959 B2
(45) Date of Patent: Sep. 13, 2022

(54) SYSTEM AND METHOD OF TIME-BASED SNAPSHOT SYNCHRONIZATION

(71) Applicant: Nutanix, Inc., San Jose, CA (US)

(72) Inventors: Ahmad Mohammad, Fremont, CA (US); Karan Gupta, San Jose, CA (US); Kiran Tatiparthi, Dublin, CA (US); Ramesh Chandra, Sunnyvale, CA (US)

(73) Assignee: Nutanix, Inc., San Jose, CA (US)

( * ) Notice: Subject to any disclaimer, the term of this patent is extended or adjusted under 35 U.S.C. 154(b) by 365 days.

(21) Appl. No.: 16/673,890

(22) Filed: Nov. 4, 2019

(65) Prior Publication Data

US 2021/0042322 A1 Feb. 11, 2021

Related U.S. Application Data

(60) Provisional application No. 62/884,082, filed on Aug. 7, 2019.

(51) Int. Cl.
*G06F 16/27* (2019.01)
*G06F 9/455* (2018.01)
*G06F 9/54* (2006.01)

(52) U.S. Cl.
CPC .......... *G06F 16/27* (2019.01); *G06F 9/45558* (2013.01); *G06F 9/54* (2013.01); *G06F 2009/45583* (2013.01)

(58) Field of Classification Search
None
See application file for complete search history.

(56) References Cited

U.S. PATENT DOCUMENTS

| | | |
|---|---|---|
| 7,725,671 B2 | 5/2010 | Prahlad et al. |
| 7,840,533 B2 | 11/2010 | Prahlad et al. |
| 8,447,728 B2 | 5/2013 | Prahlad et al. |
| 8,549,518 B1 | 10/2013 | Aron et al. |
| 8,601,473 B1 | 12/2013 | Aron et al. |
| 8,762,335 B2 | 6/2014 | Prahlad et al. |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Kim T Nguyen
(74) *Attorney, Agent, or Firm* — Foley & Lardner LLP

(57) ABSTRACT

An illustrative embodiment disclosed herein is an apparatus including a processor having programmed instructions to request, from each of a plurality of services spanning multiple clusters, a plurality of time instances. A plurality of snapshots were taken during the plurality of time instances. The processor has programmed instructions to present, to a user, the plurality of time instances and a plurality of identifiers. Each of the plurality of identifiers corresponds to one of the plurality of services. The processor has programmed instructions to receive, from the user, a first selection of a first time instance of the plurality of time instances and a second selection of a subset of the plurality of identifiers. Each of the subset of identifiers corresponds to one of a subset of the plurality of services. The processor has programmed instructions to apply, to a target, a subset of the plurality of snapshots.

21 Claims, 6 Drawing Sheets

(56) References Cited

U.S. PATENT DOCUMENTS

| | | | |
|---|---|---|---|
| 8,850,130 | B1 | 9/2014 | Aron et al. |
| 9,740,723 | B2 | 8/2017 | Prahlad et al. |
| 9,772,866 | B1 | 9/2017 | Aron et al. |
| 10,140,144 | B2 | 11/2018 | Jayachandran et al. |
| 10,210,048 | B2 | 2/2019 | Sancheti |
| 10,248,657 | B2 | 4/2019 | Prahlad et al. |
| 2011/0016089 | A1 | 1/2011 | Freedman et al. |
| 2017/0235591 | A1 | 8/2017 | Kanada et al. |
| 2018/0145879 | A1* | 5/2018 | Cook ............ H04L 41/12 |
| 2020/0007569 | A1* | 1/2020 | Dodge ........... H04L 43/06 |
| 2020/0365185 | A1* | 11/2020 | Vittal ............ G11B 27/102 |
| 2021/0042322 | A1* | 2/2021 | Mohammad ...... G06F 9/4856 |
| 2021/0081566 | A1* | 3/2021 | Broudou ......... G06N 20/10 |
| 2021/0149788 | A1* | 5/2021 | Downie .......... G06F 11/3604 |
| 2022/0159406 | A1* | 5/2022 | Mezaael .......... G07C 5/008 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jan. 8, 2019), from https://nutanixbible.com/.

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Bacon, David F. et al., "Spanner: Becoming a SQL System," (May 14-19, 2017), http://cloud.google.com/spanner, pp. 1-13.

Clark, Jack, "Google reveals Spanner, the database tech that can span the planet," (Sep. 18, 2012), https://www.zdnet.com/article/google-reveals-spanner-the-database-tech-that-can-span-the-planet/, pp. 1-5.

Corbett, James C. et al., "Spanner: Google's Globally-Distributed Database," (2012), pp. 1-14.

Shute, Jeff et al., "F1—The Fault-Tolerant Distributed RDBMS Supporting Google's Ad Business," (May 22, 2012), pp. 1-19.

Srivastava, Deepti, "Introducing Cloud Spanner: A global database service for mission-critical applications," (Feb. 14, 2017), https://cloud.google.com/blog/products/gcp/introducing-cloud-spanner-a-global-database-service-for-mission-critical-applications, pp. 1-5.

* cited by examiner

| D1W1 | D1W2 | D2W1 | | |
|---|---|---|---|---|

NOW = {0.1, 0.3}

| D2W2 | D1W3 | | | |
|---|---|---|---|---|

NOW = {0.8, 0.9}

| D2W2 | D1W3 | | | |
|---|---|---|---|---|

NOW = {0.95, 1.05}

| D2W2 | D1W3 | | | |
|---|---|---|---|---|

NOW = {1.1, 1.2}

S1 – {D1W2, D2W1}

S2 – {D1W3, D2W2}

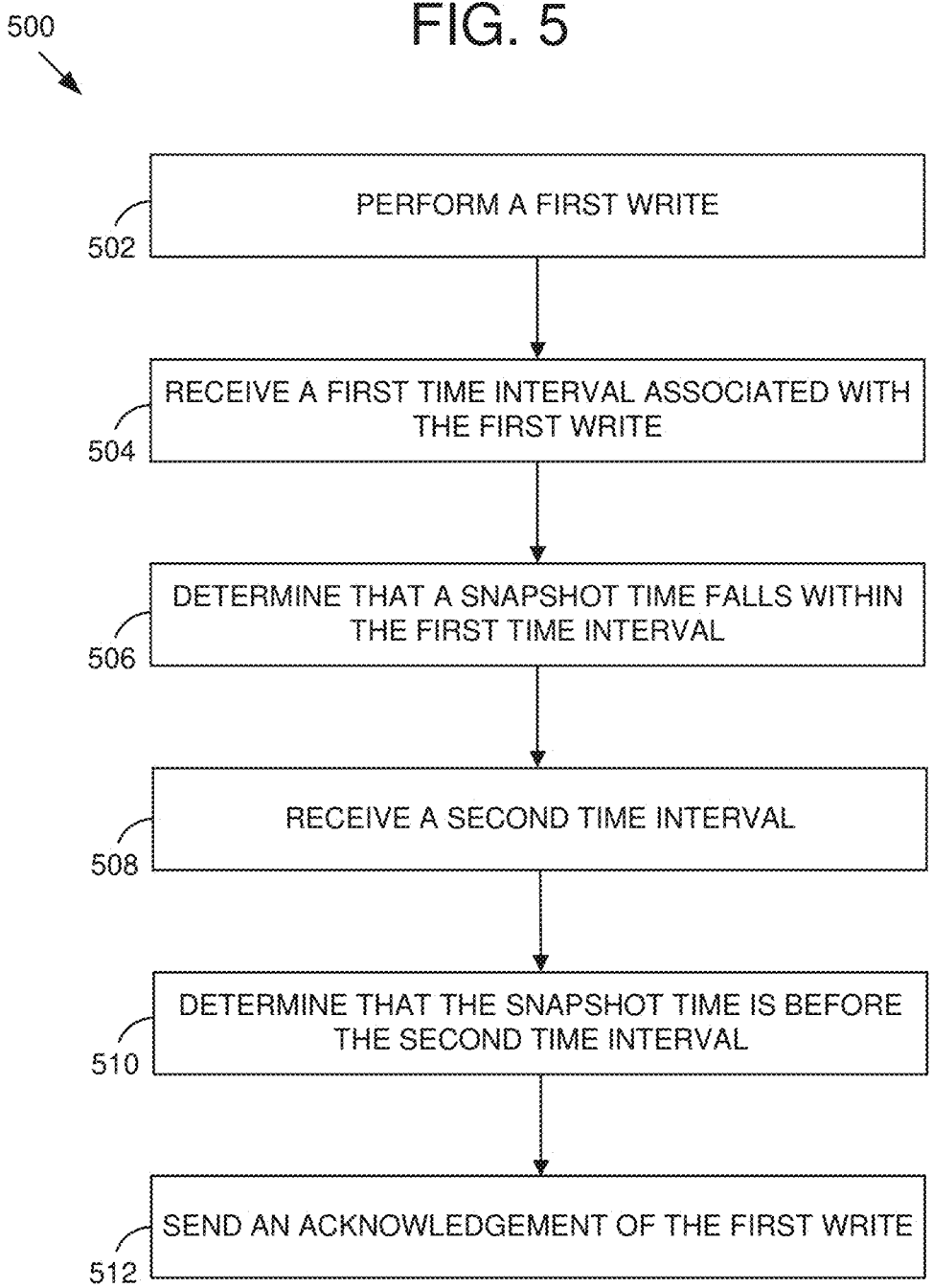

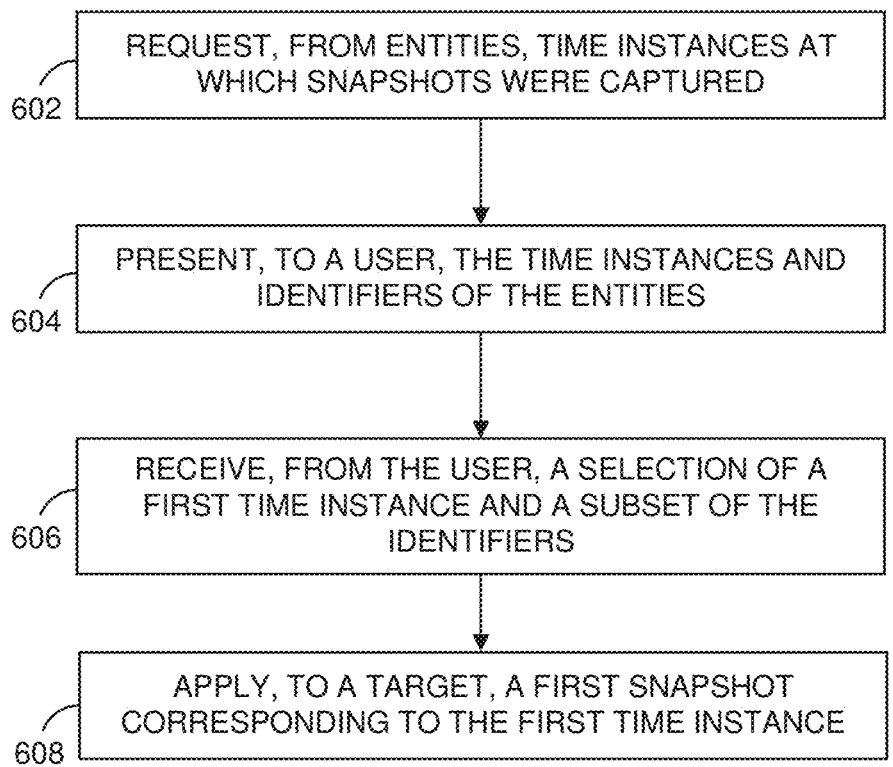

ium having
SYSTEM AND METHOD OF TIME-BASED SNAPSHOT SYNCHRONIZATION

CROSS-REFERENCE TO RELATED APPLICATION

This application is related to and claims priority under 35 U.S. § 119(e) from U.S. Provisional Application No. 62/884,082, filed Aug. 7, 2019, titled "SYSTEM AND METHOD FOR TIME-BASED SNAPSHOT SYNCHRONIZATION," the entire contents of which are incorporated herein by reference for all purposes.

BACKGROUND

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

Aspects of the present disclosure relate generally to a virtualization environment, and more particularly to a system and method for performing data consistent snapshots.

An illustrative embodiment disclosed herein is an apparatus including a processor having programmed instructions to request, from each of a plurality of services spanning multiple clusters, a plurality of time instances. A plurality of snapshots were taken during the plurality of time instances. The processor has programmed instructions to present, to a user, the plurality of time instances and a plurality of identifiers. Each of the plurality of identifiers corresponds to one of the plurality of services. The processor has programmed instructions to receive, from the user, a first selection of a first time instance of the plurality of time instances and a second selection of a subset of the plurality of identifiers. Each of the subset of identifiers corresponds to one of a subset of the plurality of services. The processor has programmed instructions to apply, to a target, a subset of the plurality of snapshots. Each of the subset of snapshots were captured at the first time by a corresponding one of the subset of services.

Another illustrative embodiment disclosed herein is a method including requesting, by a processor and from each of a plurality of services spanning multiple clusters, a plurality of time instances. A plurality of snapshots were taken during the plurality of time instances. The method includes presenting, by the processor and to a user, the plurality of time instances and a plurality of identifiers. Each of the plurality of identifiers corresponds to one of the plurality of services. The method includes receiving, by the processor and from the user, a first selection of a first time instance of the plurality of time instances and a second selection of a subset of the plurality of identifiers. Each of the subset of identifiers corresponds to one of a subset of the plurality of services. The method includes applying, by the processor and to a target, a subset of the plurality of snapshots. Each of the subset of snapshots were captured at the first time by a corresponding one of the subset of services.

Another illustrative embodiment disclosed herein is a non-transitory computer readable storage medium having instructions stored thereon that, upon execution by a processor, causes the processor to perform operations including requesting, from each of a plurality of services spanning multiple clusters, a plurality of time instances. A plurality of snapshots were taken during the plurality of time instances. The operations include presenting, to a user, the plurality of time instances and a plurality of identifiers. Each of the plurality of identifiers corresponds to one of the plurality of services. The operations include receiving, from the user, a first selection of a first time instance of the plurality of time instances and a second selection of a subset of the plurality of identifiers. Each of the subset of identifiers corresponds to one of a subset of the plurality of services. The operations include applying, to a target, a subset of the plurality of snapshots. Each of the subset of snapshots were captured at the first time by a corresponding one of the subset of services.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 3A-3D are example illustrations of acknowledging I/Os, in accordance with some embodiments of the present disclosure.

FIG. 5 is an example method for performing time-synchronized snapshots, in accordance with some embodiments of the present disclosure.

FIG. 6 is an example method for realizing time-synchronized snapshots, in accordance with some embodiments of the present disclosure.

Figure 1:
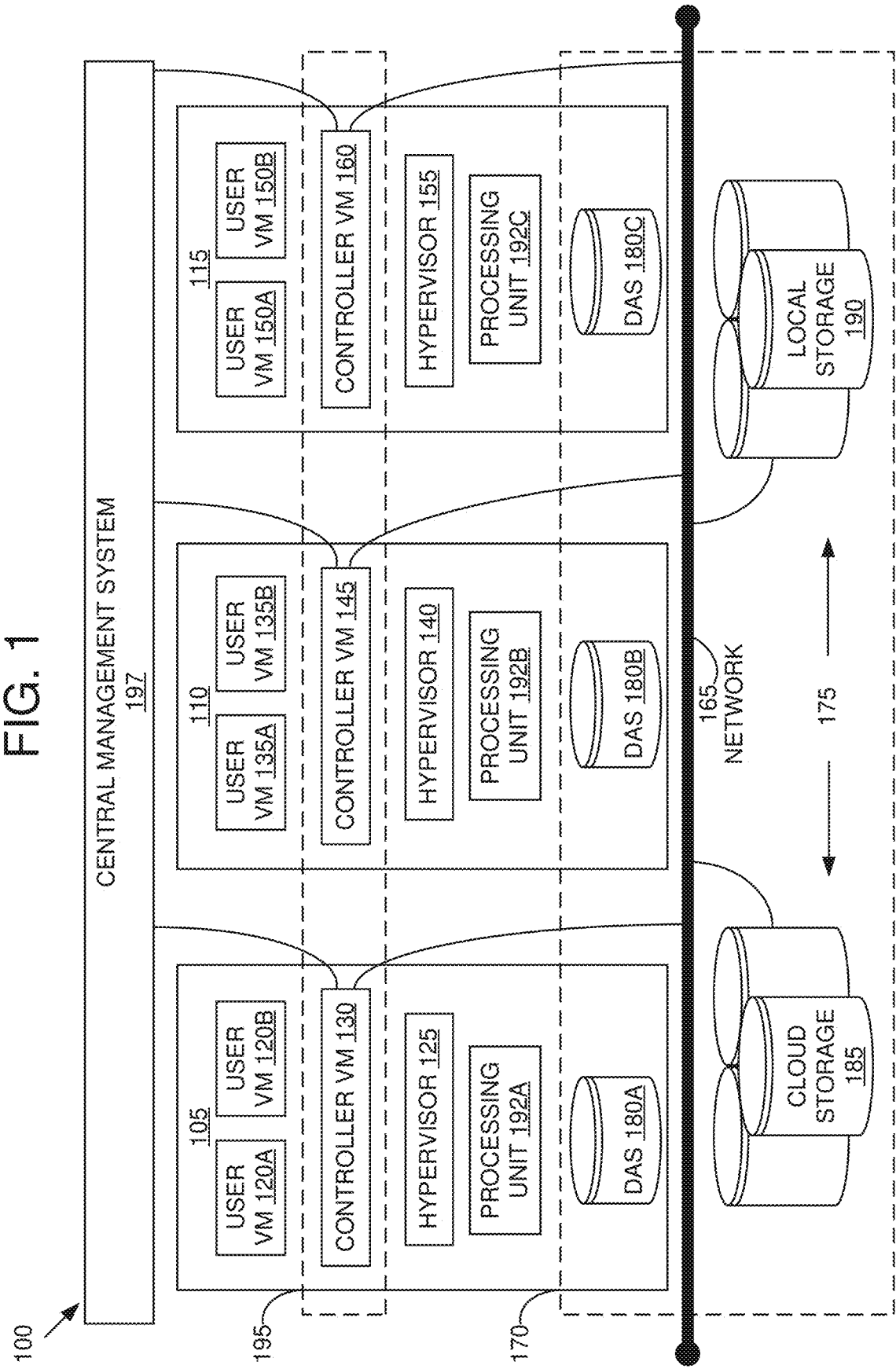
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Snapshot is a point in time representation of a state, including data and metadata, of an entity such as a virtual machine. A data consistent snapshot captures the data and metadata order. For example, if a second write is dependent on a first write, the first write is not captured in a first snapshot after a second snapshot in which the second write is captured. Data consistent snapshots are used to recover, replicate, or otherwise configure the entity. As service oriented architectures become more popular, the data and/or metadata could span multiple services, nodes, and/or clusters. To recover the entity, a system needs to capture the control and management state along with the data snapshot. Such a state is owned by several services and frequent interaction among the services increase the latency of taking snapshots. Thus, there exists a technical problem of capturing and realizing data consistent snapshots of the distributed state across the services using a high frequency snapshot schedule.

Some embodiments of the present disclosure include a system and method for capturing data consistent, high-frequency snapshots of a state distributed across services by providing a synchronized clock to all of the services. With a synchronized time across the services, resources associated with each service (or components therein) captures its own snapshot and is capable of providing the consistent data and metadata given any point in time. When a snapshot needs to be realized, resources associated with a single service could query for the consistent point and realize the state of the entity. With synchronized time, the frequent interaction within services can be avoided except for when a cross-service snapshot is to be realized.

Some embodiments of the present disclosure include a snapshot aggregator that has the knowledge to stitch the snapshots across multiple clusters. In some embodiments, the snapshot aggregator queries the disparate services spanning multiple clusters, using APIs, for time instances at which snapshots were captured. In some embodiments, the snapshot aggregator presents the time instances and identifiers of the services to a user. In some embodiments, the snapshot aggregator receives a selection of a time instance and a subset of identifiers. In some embodiments, the snapshot aggregator applies the snapshots corresponding to the time instance and the subset of identifiers to a target. One advantage is that the snapshot aggregator can offload the task of applying the snapshots from the user. Another advantage is that the snapshot aggregator is able to talk to any service by using standard APIs, which makes the system and method scalable. Finally, the snapshot aggregator is a user friendly by presenting the user with options for realizing a snapshot.

Some conventional systems do not have a synchronized time between the nodes of a clustered. The conventional systems depend on the data logical timestamps to be captured to take a data consistent snapshots across files. A central entity and writers of the conventional systems interact using a pause resume protocol for taking a data consistent snapshot. The pause resume protocol has several scale issues since the central entity has to instruct across multiple nodes and wait for the remote procedure calls (RPCs) to finish. One unresponsive writer can stall writes on the other writers. Thus, there exists a technical problem to capture data consistent snapshots of the data across the files using a high frequency (e.g. one second granularity) snapshot schedule.

Some embodiments of the present disclosure include a system and method for capturing consistent, high-frequency snapshots across files by using a time uncertainty interval provided by a time synchronization (sync) service via an application programming interface (API). The uncertainty interval that the time sync service provides can be in the order of nanoseconds and can avoid sending and waiting for the RPCs to several nodes. Resources associated with an input/output (I/O) layer can queue the I/O responses and query the time sync service for the interval. In some embodiments, when the interval is before the time of the snapshot, the resources associated with the I/O layer acknowledges the I/Os immediately, which clears the queue. In some embodiments, when the interval includes the time of snapshot, the resources associated with the I/O layer maintains the I/Os responses in the queue. In some embodiments, when the interval is after the time of the snapshot, the resources associated with the I/O layer acknowledges the remaining I/Os, releasing the remaining I/O responses from the queue. In some embodiments, since each node has an I/O layer, resources associated with an independent service can query the timestamp of all the files at a given point in time and realize a snapshot across any set of files.

Virtualization Technology and Environment

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller VM 145, and the third node 115 includes user VMs 150A and 150B (collectively referred to herein as "user VMs 150"), a hypervisor 155, and a controller VM 160. The controller VM 130, the controller VM 145, and the controller VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage (NAS) 175 and direct-attached storage (DAS) 180A, 180B, and 180C (collectively referred to herein as DAS 180). The NAS 175 is accessible via the network 165 and, in some embodiments, may include cloud storage 185, as well as local storage area network 190 (also referred to as networked storage 190). In contrast to the NAS 175, which is accessible via the network 165, the DAS 180 includes storage components that are provided internally within each of the first node 105, the second node 110, and the third node 115, respectively, such that each of the first, second, and third nodes may access its respective DAS without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller VM 130, the controller VM 145, and the controller VM 160, and/or the hypervisor 125, the hypervisor 140, and the hypervisor 155. One or more of the first node 105, the second node 110, and the third node 115 may be organized in a variety of network topologies.

Also, the first node 105 may include one or more processing units 192A, the second node 110 may include one or more processing units 192B, and the third node 115 may include one or more processing units 192C. The processing units 192A, 192B, and 192C are collectively referred to herein as the processing units 192. The processing units 192 may be configured to execute instructions. The instructions may be carried out by a special purpose computer, logic circuits, or hardware circuits of the first node 105, the second node 110, and the third node 115. The processing units 192 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units 192, thus, execute an instruction, meaning that they perform the operations called for by that instruction.

The processing units 192 may be operably coupled to the storage pool 170, as well as with other elements of the first node 105, the second node 110, and the third node 115 to receive, send, and process information, and to control the operations of the underlying first, second, or third node. The processing units 192 may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. The RAM may be stand-alone hardware such as RAM chips or modules. Further, each of the processing units 192 may include a single stand-alone processing unit, or a plurality of processing units that use the same or different processing technology.

With respect to the storage pool 170 and particularly with respect to the DAS 180, each of the DAS 180 may include a variety of types of memory devices. For example, in some embodiments, one or more of the DAS 180 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 175 may include any of a variety of network accessible storage (e.g., the cloud storage 185, the local storage area network 190, etc.) that is suitable for use within the virtual computing system 100 and accessible via the network 165. The storage pool 170, including the NAS 175 and the DAS 180, together form a distributed storage system configured to be accessed by each of the first node 105, the second node 110, and the third node 115 via the network 165, the controller VM 130, the controller VM 145, the controller VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller VM 130, the controller VM 145, and the controller VM 160. The controller VM 130, the controller VM 145, and the controller VM 160 are configured to communicate with each other via the network 165 to form a distributed system 195. Each of the controller VM 130, the controller VM 145, and the controller VM 160 may also include a local management system configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller VM 130, the controller VM 145, the controller VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller VM (e.g., the controller VM 130, the controller VM 145, or the controller VM 160, respectively) on the underlying node (e.g., the first node 105, the second node 110, or the third node 115, respectively). Upon receiving the input/output request, that controller VM may direct the input/output request to the controller VM (e.g., one of the controller VM 130, the controller VM 145, or the controller VM 160) of the leader node. In some cases, the controller VM that receives the input/output request may itself be on the leader node, in which case, the controller VM does not transfer the request, but rather handles the request itself.

The controller VM of the leader node may fulfil the input/output request (and/or request another component within the virtual computing system 100 to fulfil that request). Upon fulfilling the input/output request, the controller VM of the leader node may send a response back to the controller VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") In some embodiments, a cluster is cluster of nodes within a same local or private network. Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments the virtual computing system 100 includes a central management system 197 that is configured to manage and control the operation of the various clusters in the virtual computing system. In some embodiments, the central management system 197 may be configured to communicate with the local management systems on each of the controller VM 130, the controller VM 145, the controller VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Time-Synchronized Snapshots

Data is stored as a series of snapshots. A snapshot representation of an entity (e.g., a service, multiple services, a VM, a storage tier) can provide a consistent data set for a particular point in time. The snapshot can be used to generate a representation of the stored data corresponding to the state of the entity at the time the snapshot was captured.

Figure 2:
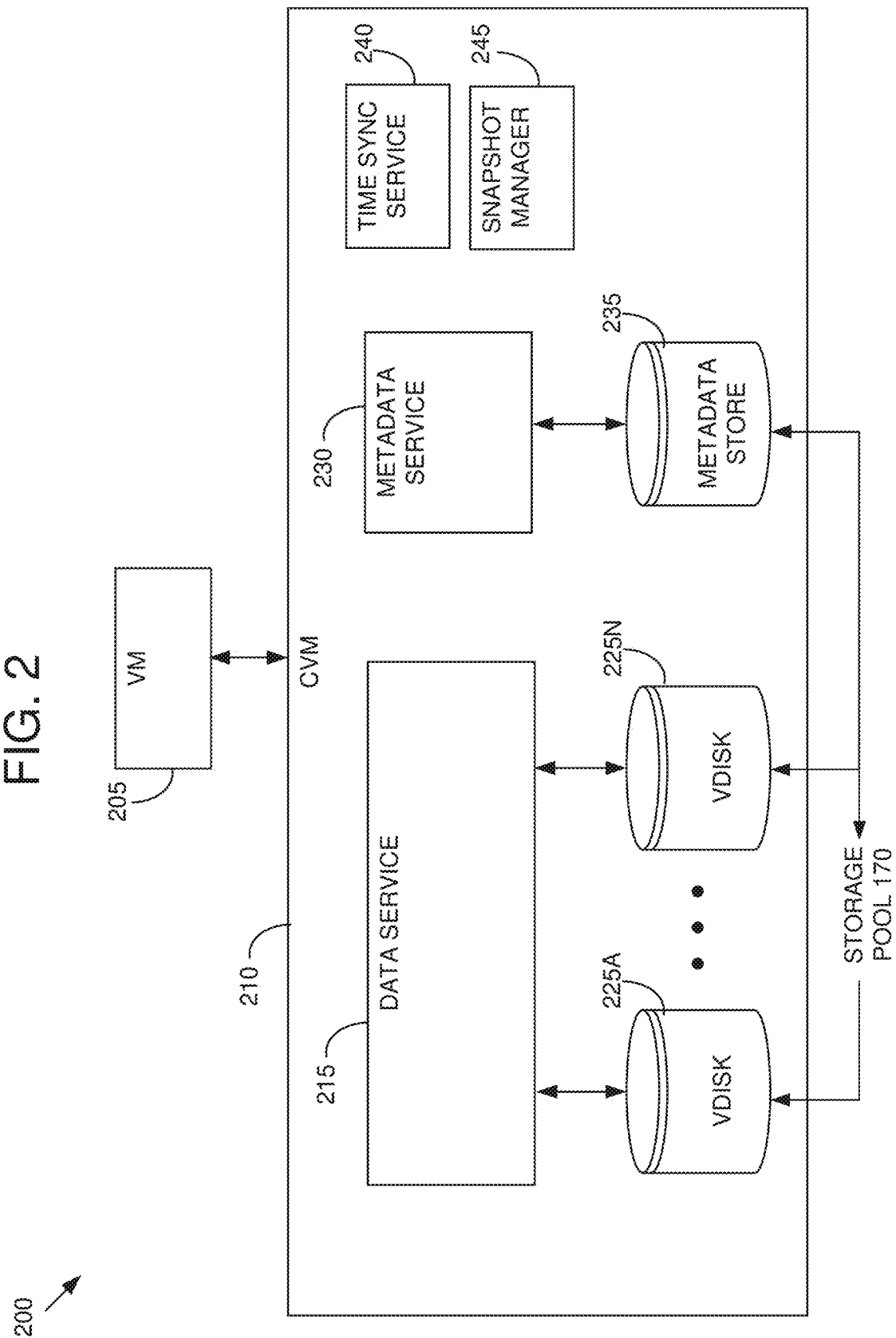
FIG. 2 is an example block diagram of a node for performing time-synchronized snapshots, in accordance with some embodiments of the present disclosure.

Referring now to FIG. 2, a node 200 for performing time-synchronized snapshots is shown. The node 200 includes a VM 205 and a CVM 210. The CVM 210 includes a data service 215, vdisks 225A-225N in communication with the data service 215, a metadata service 230, a metadata store 235 in communication with the metadata service 230, a time sync service 240, and a snapshot aggregator 245. The vdisks 225A-225N and the metadata store 235 are backed by a storage pool (e.g. the storage pool 170 as shown in FIG. 1). The storage pool may be spread across multiple nodes.

In some embodiments, for the snapshots to be taken in a service oriented architecture, each service managing the data or metadata captures snapshots. For example, VM level data is managed by the data service 215 and VM level metadata is managed by the metadata service 230. By writing API calls to the time sync service 240, each individual service can take snapshots independently without communicating to each other. This can be extended to any number of services without any performance impact or extra penalties in terms of communication. A snapshot aggregator 245 can realize a snapshot by aggregating the snapshots from the respective individual services.

The data service 215 includes a processor (e.g., the processing unit 192A) having programmed instructions (herein, the data service 215 includes programmed instructions) to read from and write data to the vdisks 225A-225N. The data includes data associated with the VM 205 (e.g., data accessed by the VM 205 or data for executing applications running on the VM 205), in some embodiments. When data is received by the data service 215, all the data can be identified using a logical timestamp and each snapshot can capture the latest timestamp it represents. All the data can be written immediately but only acknowledged back to a client (e.g. the VM 205 and/or a user of the VM 205) when the appropriate information is captured for the snapshot. For instance, if the time interval is before the time of snapshot, the writes can be acknowledged immediately. If the time interval includes the snapshot time, the acknowledgement can be delayed until the time of snapshot passes. In some embodiments, the data service 215 includes one or more vdisk controllers. In some embodiments, the vdisk controllers are logical constructs that back up, replicate, or otherwise store or transfer, data such as user files.

The metadata service 230 includes a processor having programmed instructions (herein, the metadata service 230 includes programmed instructions) to read from and write data to the metadata store 235. Metadata includes a configuration (config) state of the VM 205 or a state of a storage tier (e.g., a vdisk or an underlying physical disk backing the vdisk), in some embodiments. In some embodiments, the metadata changes very infrequently. In some embodiments, the metadata service 230 includes programmed instructions to capture a snapshot as part of every change and waits for the interval amount of time to ensure that there is only one valid state at any given time across the cluster. In some embodiments, a snapshot retention time is communicated across the services.

In some embodiments, the metadata includes VM policies and analytics. In some embodiments, the VM policies include any policy data or metadata associated with a VM, a user of a VM, or a storage allocated to a VM such as data replication policies, cloning policies, migration policies, backup policies, disaster recovery policies, and the like. The analytics may include data on resource utilization, I/O utilization, storage utilization, I/O latency, IOPS, and the like. The analytics and VM policies may be at a VM level, node level, cluster level, or multi-cluster level. In some embodiments, the VM policies and analytics are in a management service separate from the metadata service 230.

Writes serviced by any service are captured as part of a consistent snapshot for that service. For capturing writes at the same point in time, an I/O layer (e.g., the data service 215 or the metadata service 230) includes programmed instructions to acknowledge the writes in each service after some criteria is met, according to some embodiments. Hereinafter, we assume the I/O layer is the data service 215 without loss of generality. Referring now to FIGS. 3A-3D, example illustrations 300A-300D of acknowledging I/Os is shown. In illustration 300A of FIG. 3A, an indication of a first write to a first disk (D1W1), an indication of a second write to the first disk (D1W2), and an indication of a first write to a second disk (D2W1) is stored in a queue S1. Hereinafter, an indication of a write is referred to as a write. In some embodiments, the first disk is the vdisk 225A and the second disk is the vdisk 225N. In some embodiments, showing a write in a queue indicates that the write has not been acknowledged.

Still referring to FIG. 3A, in some embodiments, the data service 215 includes programmed instructions to fetch a first time interval of {0.1, 0.3}, where the first number indicates a start time of the time interval, in seconds, and the second number indicates a stop time of the time interval, in seconds. In some embodiments, snapshots are taken every one second, at integer values (e.g., 1, 2, 3, etc.). Thus, in some embodiments, the data service 215 includes programmed instructions to determine that the first time interval is before a snapshot time (e.g., 1). In some embodiments, the data service 215 includes programmed instructions to open the queue S1 and store, in the queue S1, latest writes to each disk (e.g., D1W2 and D2W1). In some embodiments, the data service 215 includes programmed instructions to immediately acknowledge the writes (e.g., to the VM 205) and clear the queue S1.

FIGS. 3B-3D illustrate three alternative scenarios wherein a second time interval is fetched after two additional writes, D2W2 and D1W3 are added to the queue S1. In the embodiment illustrated by FIG. 3B, the data service 215 includes programmed instructions to fetch the second time interval of {0.8, 0.9}. The data service 215 includes programmed instructions to determine that the second time interval is before the snapshot time, in some embodiments. In some embodiments, the data service 215 includes programmed instructions to update the queue S1 to include D1W3 and D2W2 (e.g. overwriting D1W2 and D2W1) and immediately acknowledge the writes D1W3 and D2W2.

In the embodiment illustrated by FIG. 3C, the second time interval is {0.95, 1.05}. The data service 215 includes programmed instructions to determine that the second time interval includes the snapshot time, in some embodiments. In some embodiments, the data service 215 includes programmed instructions to pause the acknowledgements of D2W2 and D1W3. In some embodiments, the data service 215 includes programmed instructions to capture/finalize a snapshot of the queue S1. In some embodiments, the data service 215 includes programmed instructions to not capture the snapshot while the time interval includes the snapshot time. In some embodiments, the data service 215 includes programmed instructions to include the unacknowledged writes, D2W2 and D1W3, in the snapshot capture, overwriting D1W2 and D2W1 in the queue S1. In some embodiments, the data service 215 includes programmed instructions to not include the unacknowledged writes, D2W2 and D1W3, in the snapshot capture.

In the embodiment illustrated by FIG. 3D, the second time interval is {1.1, 1.2}. In some embodiments, the data service 215 includes programmed instructions to capture/finalize a snapshot of the queue S1 as D1W2 and D2W1. In some embodiments, the data service 215 includes programmed instructions to immediately acknowledge the writes D2W2 and D1W3, open a new queue S2 and store the writes D2W2 and D1W3 in the queue S2.

In another example, the data service 215 includes programmed instructions to accept writes with timestamps t1 to t100 and processes t1 to t50. Before acknowledging the writes back to the Network File System (NFS) layer, the writes are queued, in some embodiments. An independent component drains the acknowledgement queues after reading the interval from the time sync protocol, in some embodiments. In one example, after the writes t1 to t50 are queued, the fetched interval is {0.1, 0.8}. The data service 215 includes programmed instructions to determine, in some embodiments, that the interval is before (e.g. the start and stop time are lower than) the snapshot capture time of 1. In some embodiments, the data service 215 includes programmed instructions to acknowledge up to t50.

Then, in one example, when the writes t51 to t80 are queued and the next fetched interval {0.9, 1.1}, all acknowledgements of t51 to t80 are stalled and, in some embodiments, a snapshot is taken with t80 as the snapshot point. Then, in one example, when the writes t81 to t90 are queued and the next fetched interval {1, 1.2}, all acknowledgements of t81 to t90 are stalled. Then, in one example, when the next fetched interval is {1.1, 1.4}, the snapshot time is passed and all the writes in the queue are acknowledged. Although, in the example, the data service 215 did not capture all the timestamps (e.g. t81 to t90) received during the snapshot time interval, the fact that uncaptured timestamps did not get acknowledged makes the snapshot data consistent as the dependent writes are all captured.

In case the interval is well above a predefined threshold, in some embodiments, the data service 215 includes programmed instructions to independently decide to take snapshots at a lower granularity, and when aggregating the snapshots, the snapshot aggregator 245 loses granularity of the snapshots for some entities. For example, the data service 215 and the metadata service 230 are taking snapshots at a different interval because one of the components is busy. In some embodiments, the metadata service 230 has more snapshots and the data service 215 has less snapshots. For example, the metadata service 230 takes snapshots at {1, 2, 3, 4, 5} seconds. In some embodiments, data service 215 is unable to take a snapshot of some vdisks at some intervals and, for example, takes snapshots at {1, 3, 5} seconds. Thus, in some embodiments, the metadata service 230 snapshots at {2, 4} are not useful and snapshots can only be realized from available snapshots {1, 3, 5}.

In some embodiments, each node or service can include programmed instructions to independently decide, based on an algorithm, what granularity the each node or service can support. For example, the data service 215 includes programmed instructions to ping all the vdisks on which a VM's data is stored. The data service 215 can include programmed instructions to receive a response to each ping. The data service 215 can include programmed instructions to determine response times, each response time being a time length between a ping and the corresponding response. The data service 215 can include programmed instructions to determine a longest response time of the response times. The data service 215 can include programmed instructions to choose a granularity for a snapshot schedule that is greater than the longest response time.

Figure 4:
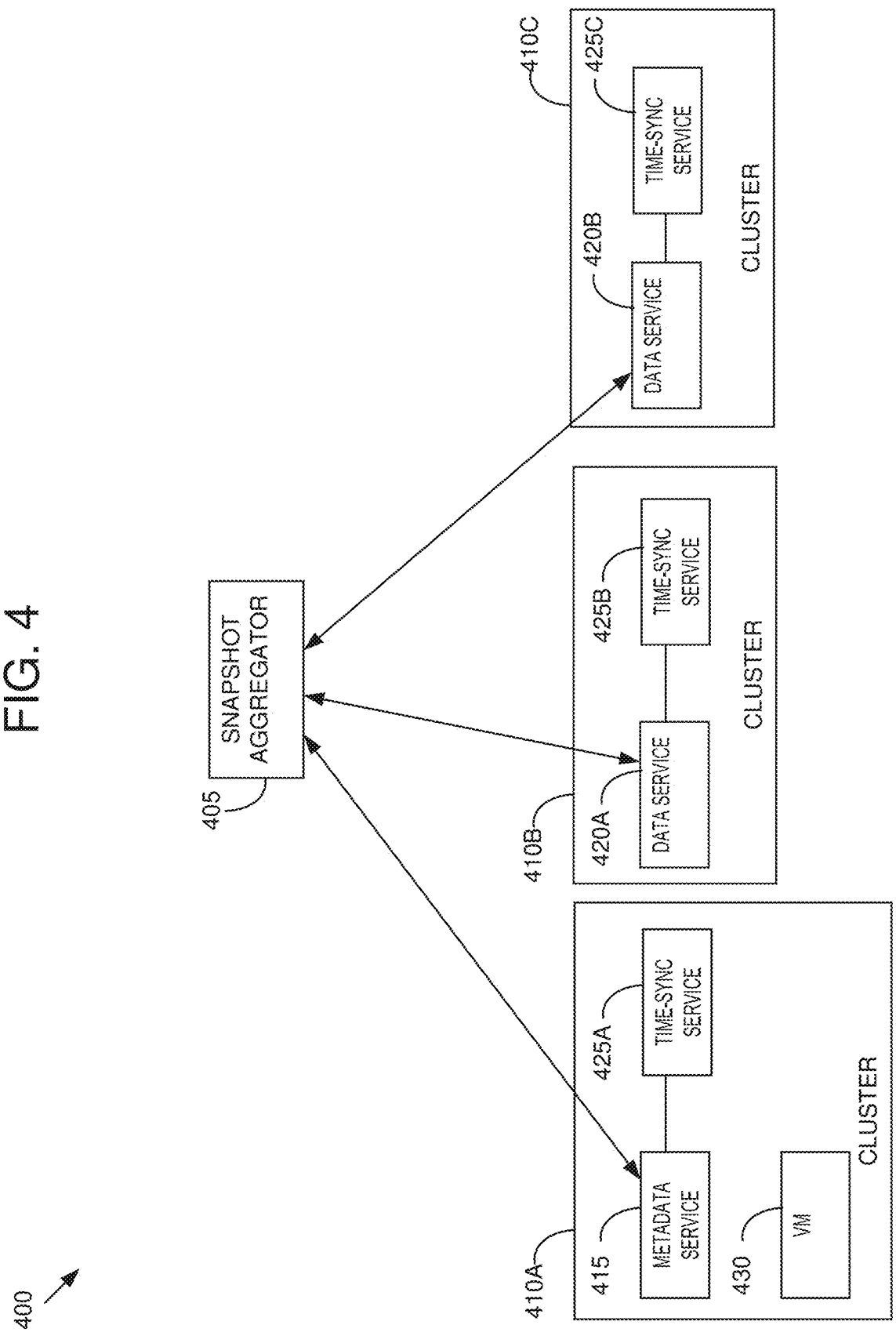
FIG. 4 is an example block diagram of a multi-cluster environment for realizing time-synchronized snapshots, in accordance with some embodiments of the present disclosure.

Referring now to FIG. 4, an example block diagram of a multi-cluster environment 400 for realizing time-synchronized snapshots is shown. The multi-cluster environment 400 includes a snapshot aggregator 405 and clusters 410A-410C. Each cluster includes a data or metadata service in communication with the snapshot aggregator 405 and a time-sync service in communication with the metadata service (e.g., the cluster 410A includes a metadata service 415 and a time-sync service 425A, the cluster 410B includes a data service 420A and a time-sync service 425B, and the cluster 410C includes a data service 420B and a time-sync service 425C). The cluster 410A includes a VM 430. The VM 430, in some embodiments, stores data on a first vdisk on the cluster 410B and a second vdisk on the cluster 410C.

In some embodiments, each of the data or metadata services (e.g., the metadata service 415, data service 420A, and data service 420B) includes a processor having programmed instructions (herein, each of the data or metadata services has programmed instructions) to capture a snapshot. For example, the metadata service 415 has programmed instructions to capture a snapshot of a VM state of the VM 430, the data service 420A has programmed instructions to capture a snapshot of the first vdisk, and the data service 420B has programmed instructions to capture a snapshot of the second vdisk. The time-sync services 425A-425C provide capture times that are consistent with each other such that a consistent snapshot of the multi-cluster environment 400 can be taken.

In some embodiments, the snapshot aggregator 405 includes a processor having programmed instructions (herein, the snapshot aggregator 405 includes programmed instructions) to receive a client request to realize a snapshot. The client request can be from a user or administrator on a device or from a service in the multi-cluster environment 400. The client request can be based on a policy. In some embodiments, the client request includes a location of each of the clusters 410A-410C or a location of each of the metadata services 415 or data services 420A-420B.

In some embodiments, the snapshot aggregator 405 includes programmed instructions to, in response to the client request, request capture times from each of the data or metadata services (e.g., the metadata service 415 and the data services 420A-420B, referred to herein as services). Each of the captured times is associated with a snapshot (e.g., a state at the captured time) captured by that service. The snapshot aggregator 405 communicates to each of the services via a corresponding application programming interface (API), in some embodiments. The API translates the snapshot aggregator 405 request to a second request that can be interpreted by the corresponding service. In some embodiments, each type of service has a custom API. In some embodiments, the services do not have a uniform granularity. For example, the metadata service 415 can take a snapshot at t0, t1, t2, t3, t4, etc., and the data services 420A-420B take a snapshot at t0, t2, t4, etc. (e.g., at half the rate of the metadata service 415). In some embodiments, the snapshot aggregator 405 includes programmed instructions to receive a response from each of the services, including the captured times.

In some embodiments, the snapshot aggregator 405 includes programmed instructions to associate a service identifier (ID) to a service. The service ID can be appended to, or otherwise associated with, each capture time or each snapshot for the corresponding service. In some embodiments, the snapshot aggregator 405 includes programmed instructions to present, to the client (e.g., a user or administrator device, VM, or application) the service IDs of the metadata service 415 or the data services 420A-420B and capture times associated with each of the metadata service 415 or the data services 420A-420B. In some embodiments, the snapshot aggregator 405 includes programmed instructions to present via a webpage. In some embodiments, the snapshot aggregator 405 receives, from the client, a selection of a capture time and one or more services.

In some embodiments, responsive to receiving the request from the client, the snapshot aggregator 405 sends a realization request to the selected one or more services to apply the selected capture time to a target. In some embodiments, the target is an entity of which the selected service previously captured the snapshot. For example, the target for applying the snapshot of the VM state can be the VM 430. In some embodiments, the target is another entity such that a state is being backed-up or replicated. In some embodiments, the target is in a different cluster than the cluster from which the snapshot was captured. In some embodiments, the snapshot aggregator 405 includes an identifier or location of the target in the realization request.

In some embodiments of the disclosure, snapshots can be captured across services, nodes, datacenters, clusters, etc. In some embodiments, every multi-cluster environment has a snapshot aggregator 405. In some embodiments, each node and/or cluster has a snapshot aggregator similar to the snapshot aggregator 405. In some embodiments, one of the snapshot aggregators is elected as a master, and the other snapshot aggregators are slaves. The master snapshot aggregator can include a processor having programmed instructions to orchestrate the aggregation of snapshots across nodes and/or clusters. Another use case is compute-only nodes. Some embodiments disclosed herein can take snapshots of the metadata and the data independently in a data center and the entity snapshot can be reconciled when needed.

Each of the services of the node 200 (e.g., the data service 215, the metadata service 230, the time sync service 240, and the snapshot aggregator 245 or a combination thereof) and the multi-cluster environment 400 (e.g., the snapshot aggregator 405, the clusters 410A-410C, the metadata service 415, the data services 420A-420B, the time-sync services 425A-425C, and the VM 430) is an apparatus, in some embodiments. The apparatus includes one or more processors (e.g., the processing unit 192A). The one or more processors are hardware or a combination of hardware and software, in some embodiments. The one or more processors have programmed instructions that, upon being executed, causes the apparatus to perform operations (e.g., read, write, send, receive, identify, determine, calculate, and the like). The programmed instructions are stored on non-transitory storage media (e.g., the storage pool 170), in some embodiments.

The VM 205 and the VM 430 may be instances of the user VM 120A described with respect to FIG. 1. The CVM 210 may be an instance of the controller VM 130 described with respect to FIG. 1. The metadata service 415 may be an instance of the metadata service 230 described with respect to FIG. 2. The data services 420A-420B may be instances of the data service 215 described with respect to FIG. 2. Although not shown in FIG. 2 or FIG. 4, the node 200 or the multi-cluster environment 400 may also include a hypervisor (e.g., the hypervisor 125), a processing unit (e.g., the processing unit 192A), local storage (e.g., the DAS 180A), a network (e.g., the network 165), and a storage pool (e.g., the storage pool 170).

Referring now to FIG. 5, an example method 500 for performing time-synchronized snapshots is shown. The method 500 for performing time-synchronized snapshots may be implemented using, or performed by, one or more of the components of the virtual computing system 100, the node 200, and/or the multi-cluster environment 400, all of which are detailed herein with respect to FIG. 1, FIG. 2, and FIG. 4. The method 500 for performing time-synchronized snapshots may be implemented using, or performed by, the data service 215, the metadata service 230, the vdisk controller 220A, a processor associated with the data service 215, a processor associated with the metadata service 230, a processor associated with the vdisk controller 220A, or a processor associated with both the data service 215 and the vdisk controller 220A. Additional, fewer, or different operations may be performed in the method 500 depending on the embodiment.

A processor performs a first write (502). In some embodiments, the processor receives a first write request, from a client (e.g. a VM or a user) associated with the first write. In some embodiments, the processor determines a snapshot schedule granularity that the processor can support. The processor receives a first time interval associated with the first write with performing the first write (504). In some embodiments, the processor receives the first time interval from a time synchronization service such as the time sync service 240.

The processor determines that a time instance associated with capturing a snapshot falls within the first time interval (506). In some embodiments, responsive to the determination in 506, the processor captures the snapshot. In some embodiments, the processor waits until the time instance associated with capturing the snapshot does not fall within the first time interval before capturing the snapshot.

The processor receives a second time interval (508). In some embodiments, the processor receives the second time interval from a time synchronization service. The processor determines that the time instance associated with capturing the snapshot is before the second time interval (510). In some embodiments, responsive to the determination in 510, the processor captures the snapshot. The processor sends an acknowledgment of the first write (512). In some embodiments, step 512 is responsive to the determination in 510.

Referring now to FIG. 6, an example method 600 for realizing time-synchronized snapshots is shown. The method 600 may be implemented using, or performed by, one or more of the components of the virtual computing system 100, the node 200, and/or the multi-cluster environment 400, all of which are detailed herein with respect to FIG. 1, FIG. 2, and FIG. 4. The method 600 may be implemented using, or performed by, the snapshot aggregator 405 or a processor associated with the snapshot aggregator 405. Additional, fewer, or different operations may be performed in the method 600 depending on the embodiment.

A processor (e.g., the processor associated with the snapshot aggregator 405) requests, from each of a plurality of services, a plurality of time instances during which snapshots were captured by the services (e.g., snapshot capture times) (602). In some embodiments, the plurality of services is a plurality of heterogeneous services (e.g. the metadata service 415 and the data services 420A-420B). In some embodiments, the plurality of services span multiple clusters (e.g., some of the services are in a first cluster, some are in a second cluster, etc.). In some embodiments, the snapshots are snapshots (e.g., states) of source entities (e.g., the VM 430, a first vdisk, and a second vdisk).

In some embodiments, the processor receives a response from each of the plurality of services, including the plurality of time instances. In some embodiments, the time instances correspond to snapshots for all of the services. In some embodiments, some of the time instances correspond to snapshots for some of the services, but not others. In some embodiments, some services capture snapshots more frequently than another services.

The processor presents, to a user (e.g., a device), the plurality of time instances and identifiers (IDs) of the plurality of services (604). Each of the identifiers corresponds to one of the services. In some embodiments, the processor associates each of the service IDs to a corresponding service. In some embodiments, the time instances and the identifiers are presented via a webpage. In some embodiments, time instances are presented separately for each service. In some embodiments, time instances are presented for which all of the services have corresponding snapshots.

The processor receives, from the user, a first selection of a first time instance of the plurality of time instances and a second selection of a subset of the identifiers (606). Each of the subset of identifiers corresponds to one of a subset of the services. Each of the subset of services has a snapshot that was captured at the time instance.

The processor applies, to a target, a plurality of snapshots corresponding to the subset of identifiers and the first time instance (608). Each of the subset of snapshots were captured at the first time instance by a corresponding one of the subset of services. In some embodiments, the target is the sources. In other words, in some embodiments, each of the snapshots is applied to the source of which the snapshot was taken. In some embodiments, the target is another VM or another vdisk. Another VM or another vdisk is, in some embodiments, on a different cluster than the source.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. An apparatus comprising a processor and a memory, the memory comprising programmed instructions that, when executed by the processor, cause the apparatus to:
   request, from a first service, a first snapshot of the first service at a first time instance and a second snapshot of the first service at a second time instance;
   request, from a second service, a first snapshot of the second service at the first time instance and a second snapshot of the second service at the second time instance;
   request from a third service, a first snapshot of the third service at the first time instance and a second snapshot of the third service at the second time instance;
   present, to a user, the first time instance, the second time instance, an identifier of the first service, an identifier of the second service, and an identifier of the third service;
   receive, from the user, a selection of the first time instance, the first service, and the second service; and
   apply, to a target, the first snapshot of the first service and the first snapshot of the second service, wherein the first service, the second service, or the third service includes a data service capturing a first snapshot of a vdisk and metadata service capturing a second snapshot of a virtual machine.

2. The apparatus of claim 1, wherein the first service, the second service, and the third service are a plurality of heterogeneous services.

3. The apparatus of claim 1, wherein the processor communicates with the first service, the second service, and the third service using a plurality of application programming interfaces (APIs).

4. The apparatus of claim 1, wherein one of the first service, the second service, or the third service captures a first plurality of snapshots more frequently than another of the first service, the second service, or the third service captures a second plurality of snapshots.

5. The apparatus of claim 1, wherein the target is an entity from which at least one of the first service or the second service captured the first snapshot.

6. The apparatus of claim 1, wherein the target is another entity different from an entity from which at least one of the first service or the second service captured the first snapshot.

7. The apparatus of claim 6, wherein the another entity is in a different cluster than the entity.

8. A method comprising:
   requesting, by a processor and from a first service, a first snapshot of the first service at a first time instance and a second snapshot of the first service at a second time instance;
   requesting, by the processor and from a second service, a first snapshot of the second service at the first time instance and a second snapshot of the second service at the second time instance;
   requesting, by the processor and from a third service, a first snapshot of the third service at the first time instance and a second snapshot of the third service at the second time instance;
   presenting, by the processor and to a user, the first time instance, the second time instance, an identifier of the first service, an identifier of the second service, and an identifier of the third service;
   receiving, by the processor and from the user, a selection of the first time instance, the first service, and the second service; and
   applying, by the processor and to a target, the first snapshot of the first service and the first snapshot of the second service, wherein the first service, the second service, or the third service includes a data service capturing a first snapshot of a vdisk and metadata service capturing a second snapshot of a virtual machine.

9. The method of claim 8, wherein the first service, the second service, and the third service are a plurality of heterogeneous services.

10. The method of claim 8, wherein the processor communicates with the first service, the second service, and the third service using a plurality of application programming interfaces (APIs).

11. The method of claim 8, wherein one of the first service, the second service, or the third service captures a first plurality of snapshots more frequently than another of the first service, the second service, or the third service captures a second plurality of snapshots.

12. The method of claim 8, wherein the target is an entity from which at least one of the first service or the second service captured the first snapshot.

13. The method of claim 8, wherein the target is another entity different from an entity from which at least one of the first service or the second service captured the first snapshot.

14. The method of claim 13, wherein the another entity is in a different cluster than the entity.

15. A non-transitory computer readable storage medium having instructions stored thereon that, upon execution by a processor, cause the processor to:
   request, from a first service, a first snapshot of the first service at a first time instance and a second snapshot of the first service at a second time instance;
   request, from a second service, a first snapshot of the second service at the first time instance and a second snapshot of the second service at the second time instance;
   request from a third service, a first snapshot of the third service at the first time instance and a second snapshot of the third service at the second time instance;
   present, to a user, the first time instance, the second time instance, an identifier of the first service, an identifier of the second service, and an identifier of the third service;
   receive, from the user, a selection of the first time instance, the first service, and the second service; and
   apply, to a target, the first snapshot of the first service and the first snapshot of the second service, wherein the first service, the second service, or the third service includes a data service capturing a first snapshot of a vdisk and metadata service capturing a second snapshot of a virtual machine.

16. The storage medium of claim 15, wherein the first service, the second service, and the third service are a plurality of heterogeneous services.

17. The storage medium of claim 15, wherein the processor communicates with the first service, the second service, and the third service using a plurality of application programming interfaces (APIs).

18. The storage medium of claim 15, wherein one of the first service, the second service, or the third service captures a first plurality of snapshots more frequently than another of the first service, the second service, or the third service captures a second plurality of snapshots.

19. The storage medium of claim 15, wherein the target is an entity from which at least one of the first service or the second service captured the first snapshot.

20. The storage medium of claim 15, wherein the target is another entity different from an entity from which at least one of the first service or the second service captured the first snapshot.

21. The storage medium of claim 20, wherein the another entity is in a different cluster than the entity.

* * * * *